Figure 3:
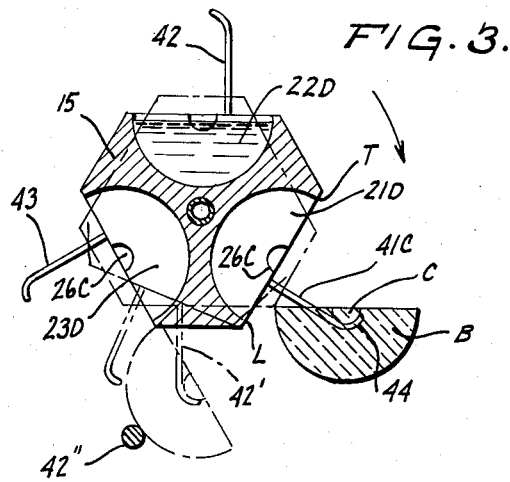

Jan. 17, 1961 H. S. LIPPINCOTT 2,968,168
FREEZING APPARATUS
Filed June 29, 1959 2 Sheets-Sheet 1
FIG. 1.
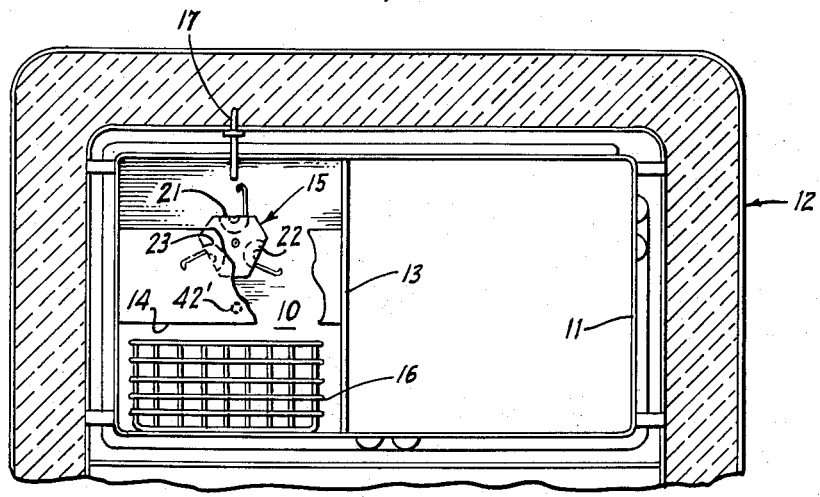
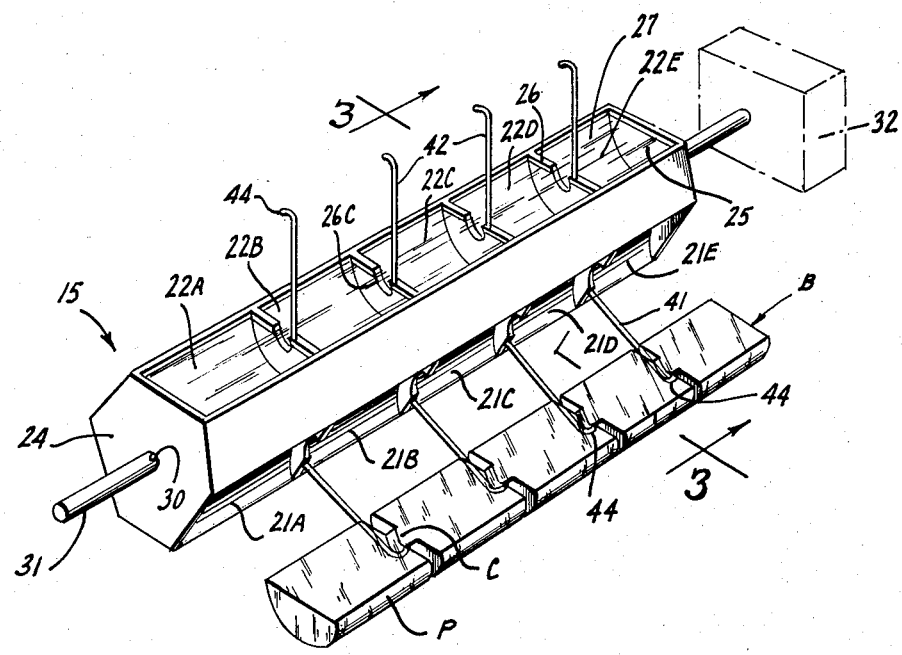
FIG. 2.
INVENTOR.
HOLLAND S. LIPPINCOTT
BY
F. D. Rogers
ATTORNEY Jan. 17, 1961  H. S. LIPPINCOTT  2,968,168
FREEZING APPARATUS
Filed June 29, 1959  2 Sheets-Sheet 2

INVENTOR.
HOLLAND S. LIPPINCOTT
BY
F. D. Prage
ATTORNEY

United States Patent Office 2,968,168
Patented Jan. 17, 1961

2,968,168

FREEZING APPARATUS

Holland S. Lippincott, Riverton, N.J., assignor to Philco Corporation, Philadelphia, Pa., a corporation of Pennsylvania Filed June 29, 1959, Ser. No. 823,695

10 Claims. (Cl. 62—344)

This invention relates to the production of ice blocks, for use in the preparation of iced beverages and the like.

The invention relates patricularly to means for the harvesting of ice blocks, by melting a film of water, and to certain types of ice blocks which can thus be obtained. This type of harvesting, involving so-called thermal release, has frequently been resorted to, as it allows production of clear, transparent "cubes," which are generally valued, and as it does so by a smooth, substantially noiseless action such as is desired in a domestic refrigerator or the like. Problems have, however, arisen with respect to drying the "wet ice," provided by such melting or thawing. This "wet ice" tends to freeze into a strongly cemented mass, which is hard to utilize and which, when broken up, fails to furnish a "cube" of such clear and transparent appearance as is often desired.

Attempts have heretofore been made to provide for thermal release and subsequent drying of ice cubes, prior to ultimate harvesting; however, difficulties have been encountered in trying to make the apparatus simple, compact, reliable, and economical. It is therefore a basic object of the invention to provide improved apparatus for the freezing, thermal releasing, and drying of ice cubes. It has been found that such apparatus can be provided in very simple forms, when the ice blocks are produced in a certain, novel shape, characterized by the provision of integral, frangible side attachments or trunnions of ice.

Specific objects of the invention are, to minimize the number of individually movable structures forming part of the apparatus; to make maximum use of each part and operation; and to insure reliable and convenient functioning of the entire device, particularly when installed in a domestic refrigerator. These and other objects, as will appear hereinafter, have been achieved by providing the novel type of ice cube, and an associated, novel drying rack structure, movable with the ice mold unit.

Preferably, the new drying racks are combined with an ice mold unit of a certain type, described and claimed in a copending application of Elmer W. Zearfoss, Jr., entitled "Freezing Apparatus and Method of Obtaining Frozen Blocks," filed June 29, 1959, under Serial No. 823,566, and assigned to the assignee of the present invention. The present invention may, accordingly, be considered in at least one aspect thereof as an improvement over or addition to said Zearfoss unit.

Figure 5:
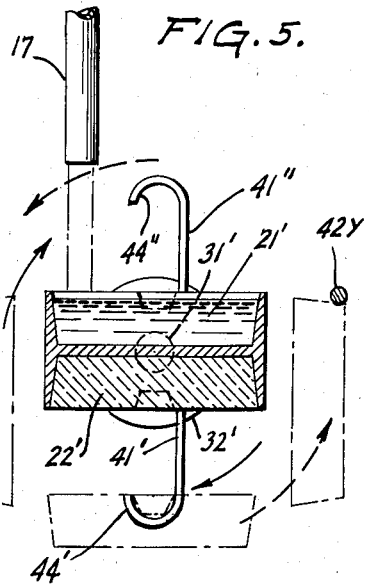
Figure 4:
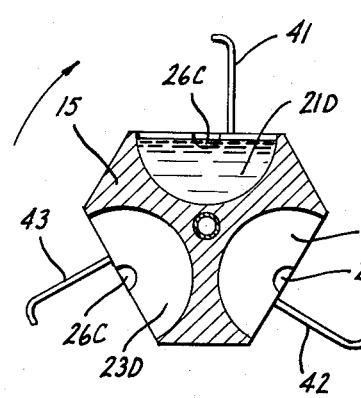
Figure 7:
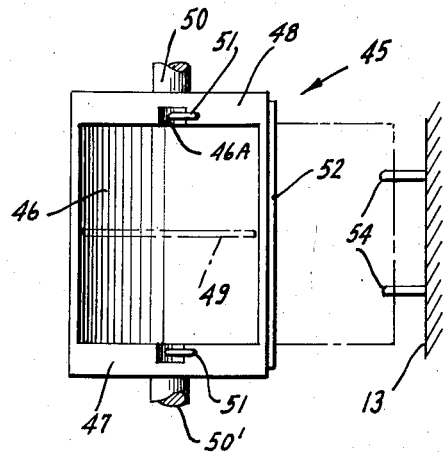
Figure 6:
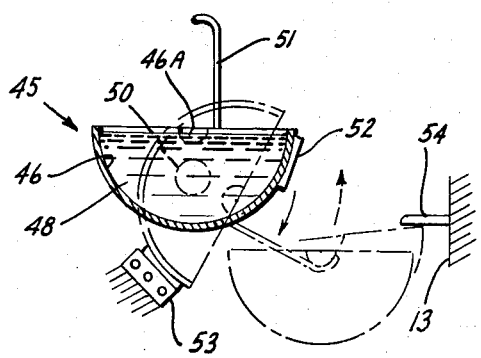

The invention will now be described in connection with the drawing, wherein Figure 1 is a front view of a preferred form of apparatus incorporating the invention. Figure 2 is a perspective view, drawn on a somewhat larger scale and showing a primary detail from Figure 1, together with the new type of ice block. Figure 3 is a sectional view of said detail, taken along line 3—3 in Figure 2. Figure 4 is a view similar to Figure 3 but showing the detail in a different phase of operation. Figures 5 and 6 are further similar views, showing modified devices. Figure 7 is a plan view of the device of Figure 6.

As shown in Figure 1 an ice cube freezing compartment 10 is formed in evaporator 11 of a refrigerator 12, by a partition 13, and an upper portion of said compartment has a structure 14 therein for permanently supporting a rotatable ice tray or mold unit 15. A lower portion of the same compartment 10 contains a removable but normally stationary ice block harvesting basket 16. A spigot 17 is provided for periodically filling a row of cups or compartments, provided in the mold unit, by operation of a suitable valve, not shown.

Freezing mold unit 15 has three rows 21, 22, 23 of ice block molds or cups, these rows being angularly spaced from one another. Each row provides, as shown in Figure 2, a series of mold cups or receptacles 21A, 21B, etc., formed between end walls 24, 25 of the unit and separated by partitions 26. The peripheral wall 27 of each row of molds, between said partitions, has the form of an arcuate surface, covering up to about one-half of the complete circle and being concave to the outside of unit 15. The surface of wall 27 is indicated as being cylindrical: it could also be spherical. The resulting ice blocks, accordingly, may briefly be called semicylindrical or hemispherical.

Parallel to the three rows of compartments, unit 15 has an elongated aperture 30, wherein a tube 31 is inserted to serve as shaft for said unit, the tube being shown as extending into and through the unit and being suitably journalled in support structure 14 (Figure 1). A motor and control unit 32 may be used for effecting intermittent angular motion of the unit, although such motion can also be effected manually.

According to the invention each partition 26 has a groove 26C in a central part of the outer edge or surface portion thereof, these grooves being arranged not only to provide passages for the successive filling of all mold cups of a row, from a single spigot 17, but also to provide for the formation of ice trunnions or connectors, between frozen ice blocks. For the latter purpose the walls of said grooves 26C form small cylinder sections, preferably coaxial with walls 27 of corresponding mold cups. Depending upon the sense in which the mold unit is rotated in the above-mentioned motion, each cup has a leading edge portion L and a trailing edge portion T (Figure 3); and several or all of the leading edge portions are provided with drying rack elements.

These elements, which together with grooves 26C form a principal characteristic of the invention, are identified by numeral 41 insofar as they are associated with row 21, by numeral 42 for row 22, and by numeral 43 for row 23. Each rack element 41, 42, 43 is shown in form of a rigid wire or rod, extending from the outer edge surface of the corresponding partition 26, at right angles thereto, over a distance approximately commensurate with the depth of the mold. A hook 44 is formed at the free end of each rack element 41, 42, 43, for engagement with the novel ice block.

Figure 2 of the drawing shows an elongate ice block B having five compact ice block portions P, with four integral, trunnion-like ice connectors C therebetween, suspended on four hook members 41–44. It will of course be understood that as to form and number of block portions P and connectors C, and as to similar details of arrangement, many variations are possible. It will also be understood that connectors C are frangible and that one of their purposes is to allow the harvesting of well-formed, adequately dried, clear and transparent block elements P.

In the operation of the illustrated unit, water is first admitted to one of the rows 21, 22, 23 of molds (for instance to row 21, of which cup 21D is visible in Figure 4). The water is frozen into a solid ice block by well-known operation of evaporator 11 (Figure 1); and the row of ice cups, containing the solid ice block unit B, is then turned by any convenient means such as mechanism 32 (Figure 2) into a downwardly and laterally facing position. The ice is then removed therefrom with the aid of a partial melting or thawing operation; such melting being produced for instance by such heat as is present in water, admitted to the next following, now upwardly facing row of mold cups.

When a sufficient amount of heat has been applied, the entire unit B of ice block elements P, formed in row 21 and interconnected by relatively thin ice connectors C in passages 26C, begins to slide in and from the corresponding mold cups, as is apparent from the drawings and as is more fully described in said Zearfoss application. Within a very short time and upon the supply of relatively little thermal energy, the block B is thus removed from the molds (Figure 3). In this process, the weight of block B causes ice connectors C to slide along the straight portions of adjacent drying rack elements 41; and said trunnions C are then intercepted by hook members 44, at the ends of said rack elements.

In this latter position (Figures 2 and 3), ice block B remains suspended, by said connectors C and hooks 44; and such condition is maintained until the water admitted to the now upwardly facing cups has been frozen. This time is of course sufficient to cause refreezing of the melt water, adhering to the surfaces of the thermally released ice block, suspended on rack 41, and thus to dry said block.

Ultimate harvesting of the removed and dried ice block occurs when the mold unit is turned again by mechanism 32 (Figure 2) and when accordingly a third row of freezing receptacles is turned upwardly. At this time the rack elements, supporting the block, pass through such positions 42' (Figure 3) that the ice block (adhering to the racks due to the above-mentioned refreezing of melt water on the trunnions) tends to break loose by gravity. Additionally, there may be provided for instance a pin, bar or rod 42", suitably attached to supporting structure 14 (Figure 1), in order to promote the breaking loose of the frangible and disposable ice trunnions C and the consequent, final harvesting of individual, dry ice block elements or bodies P in basket 16. Of course the broken-off ends of the frangible trunnions C, on each ice body P, constitute relatively uneven surfaces. Nevertheless the new type of ice cube has a surface which is much smoother and clearer than the surface of the ice fragments which can be obtained when "wet ice" is collected, which forms cemented masses.

Should any ice adhere to hooks 44, after the breaking-off operation applied at 42', such fragments melt off when they reach position 43 and/or 42 (Figure 3), at which times the entire unit is again subjected to a thermal release operation.

In the preferred embodiment, thus far described, mold unit 15 is subjected to intermittent unidirectional rotation. It is however possible also to use reciprocating rotation of a mold unit 15' about some suitable pivot 31', if only two mold chambers 21', 22' are successively used (Figure 5). The rotation can be effected by hand, or by a suitable mechanism 32'.

The drying rack devices 41', 41" of such a mold unit can be provided with hooks 44', 44" oriented in opposite directions, and combined with stationary stop means 42X, 42Y on opposite sides of the unit. The ice cups can be formed and arranged in a way generally known from Patent No. 2,407,054 of H. W. Clum, assigned to the assignee of this application; and a variety of modifications can thus be applied.

It is also possible, according to one aspect of this invention, to operate with a single mold, or row of molds, as is indicated by Figures 6 and 7. Cup 45 is shown as being formed by a curved principal wall 46 and a pair of transverse end walls 47, 48, the latter being provided with recesses 46A similar to the aforementioned grooves 26A. Transverse partitions 49 may also be provided, and a longitudinal pivoting structure 50 is suitably secured to outer portions of side walls 47, 48. According to the invention, rack members 51 are secured to edge portions of the side walls, adjacent recesses 46A, in approximately the same way as described above with respect to rack structures 41, etc.

For the purpose of temporarily raising the temperature of the mold cup, for thermal release of the ice block, wall 46 is shown as being provided with an integral contact pad 52, which pursuant to manual or automatic turning of the mold into a laterally-downwardly facing position, as shown in broken lines, contacts a stationary heating element 53 of any desired kind, suitably operated by warm or hot liquid, gas, or electricity. Desirably, pad element 52 has at least parts disposed adjacent rack members, on the leading side of cup 45 in the downward movement, so that the temporary heating operation will be sufficient also to melt any ice that may still adhere to such rack members as a result of previous operation.

Final harvesting of the ice block can be effected by the return rotation of the mold, that is, by raising said block against rigid stationary stop elements 54 and thereby breaking the ice trunnions. The stop members, as clearly shown by the drawing, can be arranged so as not to interfere with the motion of the unit when the mold, with the ice block therein, is rotated into harvesting position, but to interfere with the return rotation of the ice block, hanging on the drying rack, sufficiently to cause the final harvesting.

In all embodiments of the invention, the drying of the ice blocks which is effected by racks 41, 41', 51, etc., in conjunction with evaporator 11, improves the ultimate product considerably. In other words, the newly formed ice cubes are not simply dropped onto previously formed ones, with wet surfaces which tend to freeze together. At most, a small amount of melt water falls from the ice discharging molds into basket 16. Such water falls only onto upwardly exposed portions of previously harvested ice blocks, where it re-freezes at once; thus it causes no cementing together of upper and lower ice block surfaces.

While three embodiments of the invention have been illustrated, it should be understood that the details thereof are not to be construed as limitative of the invention, except insofar as is consistent with the scope of the following claims.

I claim:

1. In apparatus for freezing and harvesting ice blocks; a rotatable mold unit adapted to make, while disposed in predetermined positions, an ice block having laterally extending ice connectors thereon, and to thermally-gravetationally release the ice block when the unit has been rotated to other positions; drying rack means for intercepting said ice connectors upon said release of the ice block; and means for removing the ice block and connectors from the drying rack means.

2. In apparatus for making ice blocks: an intermittently rotatable mold unit for making, while disposed in a vertically upwardly facing position, an ice block having lateral ice connectors thereon, and for thermally releasing the ice block when the unit has been rotated into a downwardly facing position; and drying rack means, mounted on and intermittently rotatable with the mold unit, for intercepting said connectors upon the thermal release of the ice block.

3. In a freezing chamber such as that of a refrigerator: an intermittently rotatable, multiple tray unit, having a plurality of trays rigidly combined to face in different directions, each tray having a series of cups, for making interconnected ice blocks; means for melting the ice blocks out of such cups when they have been rotated, with the tray unit, into a downwardly facing position; a series of drying rack members, at least two mounted on each tray of the tray unit so as to intercept said interconnected ice blocks pursuant to the melting out of the ice blocks and for thereby holding the ice blocks in said freezing chamber to dry them; and a receptacle for the dried ice blocks.

4. Apparatus as described in claim 3 wherein the tray unit comprises three of said trays and said series comprises three sets of said racks, with uniform angular distances between such sets.

5. Apparatus as described in claim 3 wherein the melting means comprises means to fill certain tray cups with water, the construction and arrangement being such that the water is thereafter frozen, in such cups, into the ice blocks.

6. An ice maker comprising: a mold structure; means for freezing liquid in said mold structure into a solid body having lateral extension means thereon; means for turning the mold structure; means for releasing said body by melting surface portions of said body; a rack structure mounted on and turnable with the mold structure and so constructed and arranged as to intercept and hold such lateral extension means, upon said releasing of said body, for drying said body by freezing; said turning means being adapted to afford further motion of said mold structure with said rack structure and with said body held on the latter; and means for mechanically removing said body from said rack structure upon said further motion.

7. An ice maker as described in claim 6, wherein said mold structure comprises an arcuately contoured cup, the cross section of which forms up to one-half of a complete circle; said turning means being adapted to turn the cup into laterally-downwardly facing positon for said releasing of said body.

8. An ice maker as described in claim 6, wherein said means for heating the mold structure comprises a stationary heating element, adapted to contact the mold structure when that structure has been turned into position for said releasing of said body.

9. An ice maker as described in claim 6, wherein said means for mechanically removing said body comprises hook means on said rack structure, adapted to gravitationally release said body upon said further motion.

10. An ice maker as described in claim 6, wherein said means for mechanically removing said body includes a stationary stop element, so constructed and arranged as not to interfere with said turning for releasing said body but to interfere with said further motion of said body and thereby to break said lateral extension means intercepted by said rack structure.

References Cited in the file of this patent

UNITED STATES PATENTS

| | | |
|---|---|---|
| 1,863,070 | Newman | July 19, 1932 |
| 2,161,321 | Smith | June 6, 1939 |
| 2,717,495 | Andersson | Sept. 13, 1955 |
| 2,778,198 | Heath | Jan. 22, 1957 |